United States Patent
Yamada et al.

(10) Patent No.: US 7,227,333 B2
(45) Date of Patent: Jun. 5, 2007

(54) BATTERY, DEVICE AND CHARGER

(75) Inventors: Susumu Yamada, Gunma (JP);
Tsunehiko Yatsu, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 4 days.

(21) Appl. No.: 10/696,666

(22) Filed: Oct. 29, 2003

(65) Prior Publication Data

US 2005/0048359 A1    Mar. 3, 2005

(30) Foreign Application Priority Data

Oct. 29, 2002    (JP) .............................. 2002-313723

(51) Int. Cl.
*H02J 7/00* (2006.01)

(52) U.S. Cl. ..................................... 320/106

(58) Field of Classification Search ................ 320/106, 320/116, 132; 713/300
See application file for complete search history.

(56) References Cited

U.S. PATENT DOCUMENTS

| | | | |
|---|---|---|---|
| 5,440,299 A * | 8/1995 | Schwendeman ....... | 340/825.51 |
| 5,606,242 A * | 2/1997 | Hull et al. .................. | 320/106 |
| 5,754,029 A * | 5/1998 | Mann et al. ................ | 320/106 |
| 5,903,764 A * | 5/1999 | Shyr et al. .................. | 713/300 |
| 6,018,227 A * | 1/2000 | Kumar et al. ............... | 320/106 |
| 6,160,376 A * | 12/2000 | Kumar et al. ............... | 320/116 |
| 6,218,806 B1 * | 4/2001 | Brotto et al. ............... | 320/106 |
| 6,229,280 B1 * | 5/2001 | Sakoh et al. ................ | 320/106 |
| 6,331,761 B1 * | 12/2001 | Kumar et al. ............... | 320/132 |

FOREIGN PATENT DOCUMENTS

JP    2000-350371    12/2000

OTHER PUBLICATIONS

Smart Battery Data Specification, http://www.sbs-forum.org/specs/sbdat110.pdf, Revision 1.0, Sep. 5, 1996.*
Smart Battery Charger Specification, http://www.sbs-forum.org/specs/sbc100.pdf, Revision 1.0, Sep. 5, 1996.*
System Management Bus Specification, http://www.smbus.org/specs/smbus110.pdf, Revision 1.0, Sep. 5, 1996.*
System Management Bus BIOS Interface Specification, http://www.smbus.org/specs/smbb10.pdf, Revision 1.0, Sep. 5, 1996.*

* cited by examiner

*Primary Examiner*—Pia Tibbits
(74) *Attorney, Agent, or Firm*—SoCal IP Law Group LLP; Steven C. Sereboff; John E. Gunther

(57) ABSTRACT

A battery comprising a storage section for storing battery management information transmitted/received to/from outside through a communicator; wherein, the battery management information is at least either available device information on a device which can use the battery or chargeable charger information on a charger which can charge the battery.

2 Claims, 3 Drawing Sheets

FIG. 3

BATTERY MANAGEMENT INFORMATION
(BATTERY MANAGEMENT DATA)

|  |  | DEVICE 200 (DISCHARGE TARGET) | CHARGER 300 (CHARGE SOURCE) |
|---|---|---|---|
| IN USE | IDENTIFICATION (HISTORY) | SERIAL NUMBER (ID) | SERIAL NUMBER (ID) |
|  | BATTERY IDENTIFICATION | SERIAL NUMBER + N | SERIAL NUMBER + N |
|  | RESIDUAL CAPACITY | DISCHARGE INFORMATION (DATA) | CHARGER INFORMATION (DATA) |
| AT SHIPMENT (BEFORE USE) | USE ENABLE | AVAILABLE DEVICE INFORMATION (DATA) | CHARGEABLE CHARGER INFORMATION (DATA) |
|  | RESIDUAL CAPACITY | DISCHARGE CHARACTERISTICS (DATA) | CHARGE CHARACTERISTICS (DATA) |

12
BATTERY, DEVICE AND CHARGER

RELATED APPLICATION INFORMATION

The present application claims priority upon Japanese Patent Application No. 2002-313723 filed on Oct. 29, 2002, which is herein incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to a battery, a device, and a charger.

2. Description Of Related Art

Devices, such as electronic devices, household electrical appliances, and small machine tools including power tools, can contain batteries (battery packs) for supplying operating power to device bodies. In such a device, a mechanism for detecting the voltage of a battery to notify a user of battery management information including the residual capacity, life, or the like of the battery is incorporated. Moreover, a charger also utilizes the voltage of a battery as the battery management information when the charger charges the battery. Such battery management information can be obtained from a charge/discharge management device mainly constituted by a microcomputer incorporated in a battery (e.g., refer to Japanese Patent Application Laid-open Publication No. 2000-350371 (FIG. 9)).

However, as described in the aforementioned related art, for acquiring the battery management information, the microcomputer is incorporated in the battery (battery pack). Therefore, this becomes an obstacle to miniaturization and price reduction of the battery.

On the other hand, charge/discharge characteristics and capacities of batteries differ depending on a manufacturer even if the batteries are of the same standard, and differ depending on lots even if the batteries have been fabricated by the same manufacturer, and therefore have minute individual variations due to slight non-uniformity in manufacturing even if the batteries are from the same lot. Moreover, even if batteries have the same shape, they may be batteries of different types (e.g., a nicad battery and a nickel metal hydride battery). Furthermore, batteries of a pirated copy, which are not authorized products of manufacturers, can be on the market. In addition, charge/discharge characteristics and capacities of batteries change depending on the time length from shipment until the batteries are actually used and the condition of storage section. Further, the charge/discharge characteristics and capacities of the batteries change during the repetition of charge and discharge after the batteries have actually started being used.

As described above, when batteries having different charge/discharge characteristics and capacities are loaded into a device or a charger to be discharged or charged, it is not at all sufficient to capture only voltages of the batteries as battery management information to be used on the device or charger side.

Specifically, devices and chargers are required to be precisely adjusted for discharge or charge operations in order to make the most of the performance of batteries. In addition, there are cases where desirable batteries for devices and chargers are assumed in advance, and therefore it is also necessary to detect the case where unexpected batteries have been loaded.

SUMMARY OF THE INVENTION

One aspect of the present invention is a battery comprising a storage section for storing battery management information transmitted/received to/from outside through a communicator; wherein, the battery management information is at least either available device information on a device which can use the battery or chargeable charger information on a charger which can charge the battery.

Another aspect of the present invention is a battery comprising a storage section for storing battery management information transmitted/received to/from outside through a communicator; wherein, the battery management information is at least either discharged device history information on a device into which the battery has discharged or charger history information on a charger which has charged the battery.

Yet another aspect of the present invention is a battery comprising a storage section for storing battery management information transmitted/received to/from outside through a communicator; wherein, the battery management information is at least either battery identification information which a device inherently gives to the battery used by the device or battery identification information which a charger inherently gives to the battery charged by the charger.

Further aspect of the present invention is a device into which a battery discharges, the battery having a storage section for storing battery management information transmitted/received to/from outside through a communicator, wherein discharged device history information on the device into which the battery has discharged is supplied as the battery management information to the battery via the communicator.

Further aspect of the present invention is a device into which a battery discharges, the battery having a storage section for storing battery management information transmitted/received to/from outside through a communicator, wherein the device supplies battery identification information inherent to the battery as the battery management information to the battery via the communicator.

Further aspect of the present invention is a charger for charging a battery having a storage section for storing battery management information transmitted/received to/from outside through a communicator, wherein charger history information on the charger which has charged the battery is supplied as the battery management information to the battery via the communicator.

Further aspect of the present invention is a charger for charging a battery having a storage section for storing battery management information transmitted/received to/from outside through a communicator, wherein the charger supplies battery identification information inherent to the battery as the battery management information to the battery via the communicator.

Features and objects of the present invention other than the above will become clear by reading the description of the present specification with reference to the accompanying drawings.

DESCRIPTION OF THE DRAWINGS

For a more complete understanding of the present invention and the advantages thereof, reference is now made to the following description taken in conjunction with the accompanying drawings wherein:

FIG. 3 is a view showing a table of battery management data according to one embodiment of the present invention.

DETAILED DESCRIPTION OF THE INVENTION

At least the following matters will be made clear by the description in the present specification and the description of the accompanying drawings.

In a battery according to the present embodiment, the following can be adopted.

The discharged device history information is supplied from the device in which the battery discharges through the communication section.

Moreover, the charger history information is supplied from the charger which charges the battery through the communication section.

Basic Configuration

Figure 1:
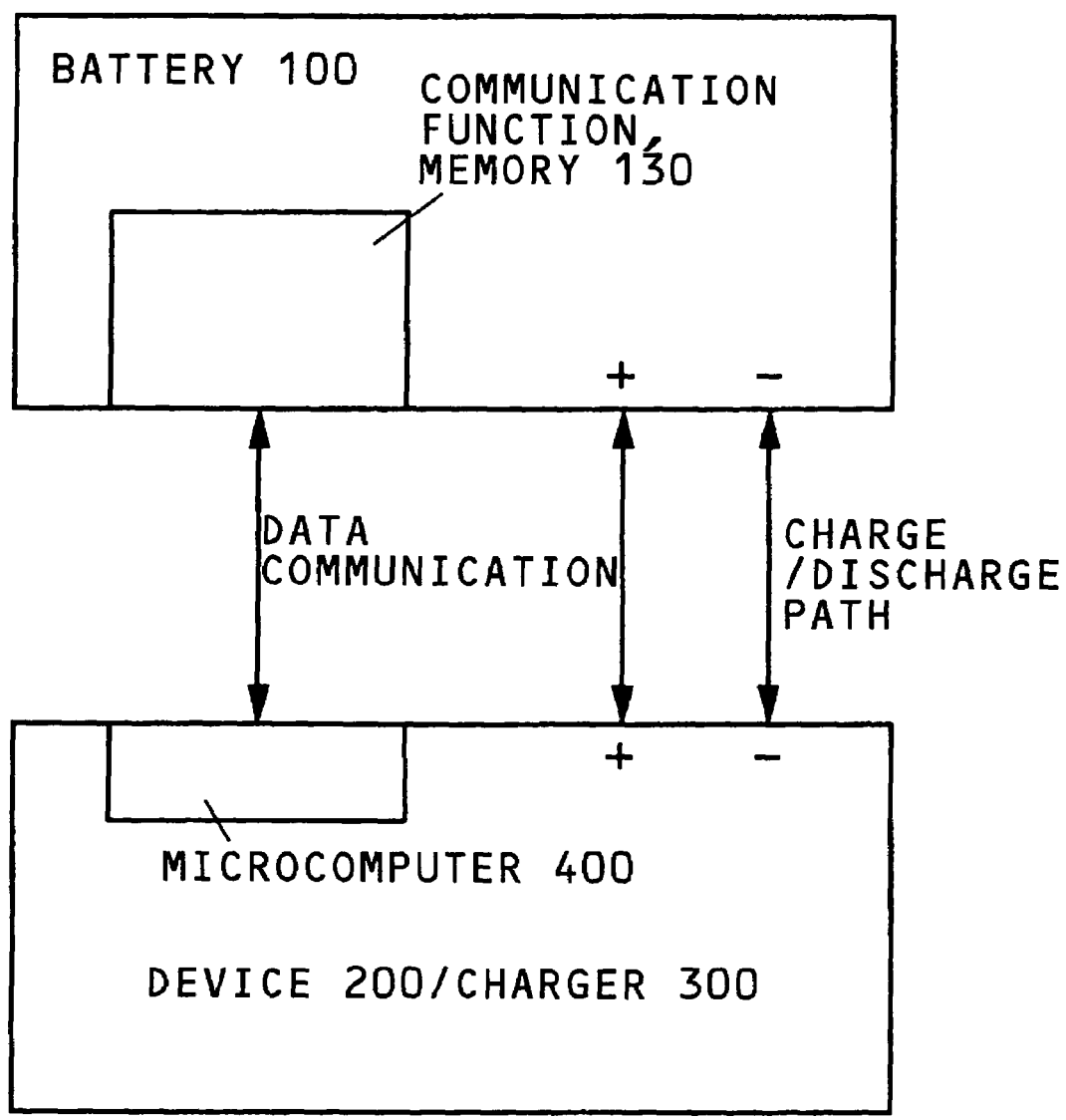
FIG. 1 is a conceptual diagram showing a battery and a device (main set) or a charger according to one embodiment of the present invention.

A conceptual diagram of a battery (pack), a device, and a charger according to one embodiment of the present invention is shown in FIG. 1. A battery 100 has a simple configuration in which no microcomputer is incorporated and which has a communication function and a memory. On the other hand, each of a device 200 and a charger 300 has a microcomputer 400 incorporated therein. The microcomputer 400 transmits/receives data relating to battery management information (hereinafter referred to as "battery management data") to/from the memory 130 on the battery 100 side. The microcomputer 400 controls the operation of charge or discharge based on the battery management data received from the battery 100 side. On the other hand, the battery 100 stores the battery management data received from the microcomputer 400 side into a memory. Moreover, by electrically connecting mutual plus terminals ("+" in this drawing) and mutual minus terminals ("−"in this drawing) of the battery 100, the device 200, and the charger 300, a charge/discharge path is thereby established.

Figure 2:
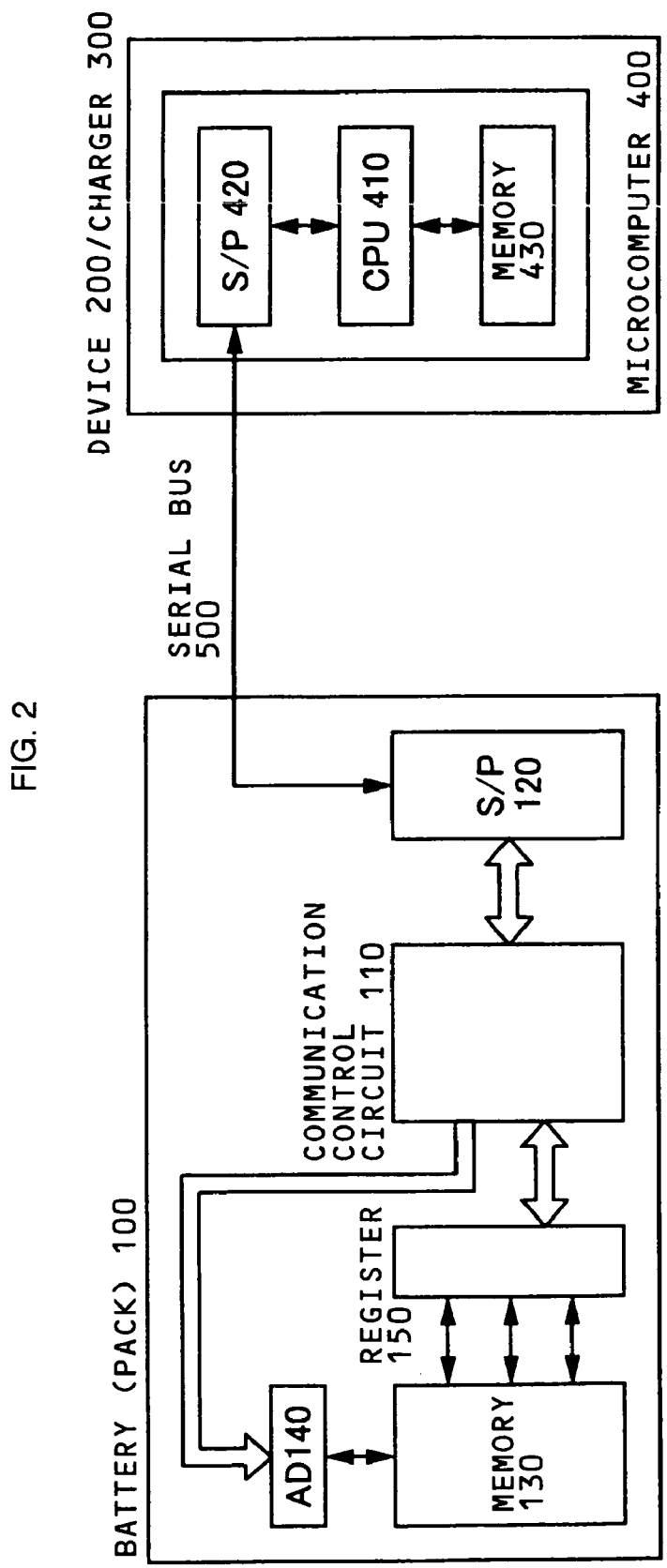
FIG. 2 is a circuit block diagram of the battery and the device (main set) or the charger according to one embodiment of the present invention.

A circuit block diagram of a concrete example of the battery 100, the device 200, and the charger 300 having the microcomputer 400 is shown in FIG. 2. The battery 100 includes a communication control circuit 110 and a serial-parallel converter 120 ("S/P" in this drawing) as a communication section. Further, the battery 100 includes the memory 130 as a storage section for the battery management data. Between the memory 130 and the communication control circuit 110, an address decoder 140 ("AD" in this drawing) and a register 150 are provided.

On the other hand, as is well known, the microcomputer 400 of the device 200 and the charger 300 includes a CPU 410, a serial-parallel converter 420 ("S/P" in this drawing), a memory 430, and the like. The battery management data is stored in the memory 430. Moreover, the serial-parallel converter 120 on the battery 100 side and the serial-parallel converter 420 on the device 200 and charger 300 side are connected through a serial bus 500.

In the above-described configuration, the battery management data is transmitted/received between the memory 130 on the battery 100 side and the memory 430 of the device 200 or the charger 300. The microcomputer 400 stores the battery management data received from the battery 100 side in the memory 430, and controls the operation of charge or discharge based on this battery management data as well. On the other hand, the battery 100 stores the battery management data received from the microcomputer 400 side into the memory 130.

The battery management data includes information relating to the history of charge and discharge for a plurality of times in the past. Specifically, the information is on the time and voltage at the start of each charge or discharge and the time and voltage at the end thereof. The battery management data further includes various types of information other than the information relating to the history of charge and discharge. Examples based on the contents of the battery management data will be described.

Information on Available Device or Charger

At the time of shipment from a manufacturer, the battery management data stored in the memory 130 of the battery 100 includes information (hereinafter referred to as "available device information") for identifying a device 200 which can use the battery. That is, as shown in a table of the battery management data of FIG. 3, data relating to the available device information is stored in the memory 130 of the battery 100. Moreover, as shown in the table (at the bottom two rows) of the battery management data of FIG. 3, the battery management data also includes data relating to charge characteristics and discharge characteristics of the battery in addition to data relating to the available device information.

When the battery 100 is actually loaded into a device 200, the device 200 reads the data relating to the available device information and the discharge characteristic data from the memory 130 of the battery 100. The device 200 checks whether the read data relating to the available device information corresponds to the device itself or not. That is, the microcomputer 400 of the device 200 reads its own device ID stored in its own memory 430, and checks whether the device ID matches the data relating to the available device information on the battery 100 side or not. If the result of the check shows that the data matches, the battery 100 is enabled to be used in the device 200. On the contrary, if the data does not match, the battery 100 is disabled for use in the device 200. Moreover, the device 200 can precisely adjust the discharge of the battery based on the acquired discharge characteristic data.

In addition, at the time of shipment from the manufacturer, the battery management data stored in the memory 130 of the battery 100 includes information (hereinafter referred to as "chargeable charger information") for identifying the charger 300 which can charge the battery. That is, as shown in the table (at the bottom two rows) of the battery management data of FIG. 3, data relating to the chargeable charger information is stored in the memory 130 of the battery 100.

Then, when the battery 100 is actually loaded into a charger 300, the charger 300 reads the data relating to the chargeable charger information and the charge characteristic data from the memory 130 of the battery 100 as described earlier. The charger 300 checks whether the read data relating to the chargeable charger information corresponds to the charger itself or not. That is, the microcomputer 400 of the charger 300 reads its own charger ID stored in its own memory 430, and checks whether the charger ID matches the data relating to the chargeable charger information on the battery 100 side or not. If the result of the check shows that the data matches, the battery 100 is enabled to be used in the charger 300. On the contrary, if the data does not match, the battery 100 is disabled for use in the charger 300. Moreover, the charger 300 can precisely adjust the charge of the battery based on the acquired charge characteristic data. Note that the chargeable charger information may be an ID merely identifying the type of the battery.

According to the present example, the battery management data relating to an available device and a chargeable charger is stored on the battery side. This makes it possible to identify an available device and a chargeable charger for each battery.

Concerning the charge/discharge characteristics and capacities of batteries, even if the batteries are of the same shape but of different types or even if differences arise depending on a manufacturer, lots, or manufacturing variability, the charge/discharge characteristics and capacity inherent to the loaded battery can be presumed by checking the correspondence with the battery management data. Accordingly, the discharge and charge of the battery can be accurately adjusted.

Furthermore, for a battery of a pirated version, which is not an authorized product, discharge can be made impossible in a device and charge can be also inhibited by checking the matching of the battery management data.

History Information on Used Device or Charger

First, when the battery 100 is loaded into a device 200 and used, the device 200 transmits (supplies) the battery management data to the battery 100. The battery management data is data relating to history information (discharged device history information) on devices into which the battery 100 has been loaded and has discharged, and is stored in the memory 130 of the battery 100. To cite an example of the battery management data of the discharged device history information, as shown in the table (at the top three rows) of the battery management data of FIG. 3, a serial number is used as data capable of identifying each device 200. As shown in FIG. 3, the battery management data includes data indicating the date and time of discharge and the state of discharge as discharge information, in addition to the serial number of device 200. Every time the battery 100 is loaded and discharges into a device 200, the battery management data is stored and accumulated in the memory 130.

When the battery 100 is loaded anew into a device 200, the device 200 reads the battery management data of the discharged device history information from the memory 130 of the battery 100. Based on the battery management data, the device 200 acquires history information as to what devices 200 the battery 100 was used by in the past. Based on the history information, the device 200 judges whether the device 200 will actually use the battery 100 as a power source for operation or not, and controls discharge.

Meanwhile, when the battery 100 is loaded into a charger 300 and charged, the charger 300 transmits (supplies) the battery management data to the battery 100. The battery management data is data relating to history information (charger history information) on chargers 300 into which the battery 100 has been loaded and from which the battery 100 has been charged, and is stored in the memory 130 of the battery 100. To cite an example of the battery management data of the charger history information, as shown in the table (at the top three rows) of the battery management data of FIG. 3, a serial number is used as data capable of identifying each charger 300. As shown in FIG. 3, the battery management data includes data indicating the date and time of charge and the state of charge as charge information, in addition to the serial numbers of chargers 300. Every time the battery 100 is loaded into a charger 300 and charged, the battery management data is stored and accumulated in the memory 130.

When the battery 100 is loaded anew into a charger 300, the charger 300 reads the battery management data of the charger history information from the memory 130 of the battery 100. Based on the battery management data, the charger 300 acquires history information on what chargers 300 the battery 100 was used by in the past. Based on the history information, the charger 300 determines whether the charger 300 actually charges the battery 100 or not, and controls charge.

According to the present example, history information relating to devices into which a battery was discharged in the past and history information relating to chargers from which the battery was charged in the past are stored in the battery side. This enables devices and chargers to acquire past history information relating to the battery.

Therefore, even if the charge/discharge characteristics and capacity of a battery change during the repetition of charge and discharge after the battery has actually started being used, the devices and the chargers can precisely adjust the discharge and charge of the battery based on the history information. Moreover, the devices and the chargers also can enable or disable charge and discharge based on the acquired history information.

Identification Information Inherent to Battery Given by Device or Charger

First, when the battery 100 is loaded into a device 200 and used, the device 200 transmits (supplies) the battery management data to the battery 100. The battery management data is data relating to battery identification information which is inherently given to the battery 100 used by the device 200, and is stored in the memory 130 of the battery 100. To cite an example of the battery management data of the battery identification information, as shown in the table (at the top three rows) of the battery management data of FIG. 3, the serial number of the device 200 into which the battery is loaded and an arbitrary number ("N" in this drawing) are used as data capable of identifying each battery 100. The battery management data includes data indicating the date and time of discharge and the state of discharge. Every time the battery 100 is loaded and discharges into a device 200, the battery management data is stored and accumulated in the memory 130.

When the battery 100 is loaded anew into a device 200, the device 200 reads the battery management data of the battery identification information from the memory 130 of the battery 100. Based on the battery management data, the device 200 can distinguish whether the device 200 has used the battery 100 in the past or not. In addition, the device 200 can acquire history information as to what other devices 200 used the battery 100 in the past. Based on the battery identification information, the device 200 judges whether the device 200 will actually use the battery 100 as a power source for operation or not, and controls discharge.

Meanwhile, when the battery 100 is loaded into a charger 300 and charged, the charger 300 transmits (supplies) the battery management data to the battery 100. The battery management data is data relating to battery identification information which is inherently given to the battery 100 used by the charger 300, and is stored in the memory 130 of the battery 100. To cite an example of the battery management data of the battery identification information, as shown in the table (at the top three rows) of the battery management data of FIG. 3, the serial number of the charger 300 into which the battery is loaded and an arbitrary number ("N" in this drawing) are used as data capable of identifying each battery 100. The battery management data includes data indicating the date and time of charge and the state of charge. Every time the battery 100 is loaded into a charger 300 and charged, the battery management data is stored and accumulated in the memory 130.

When the battery 100 is loaded anew into a charger 300, the charger 300 reads the battery management data of battery identification information from the memory 130 of the battery 100. Based on the battery management data, the charger 300 can distinguish whether the charger 300 has used the battery 100 in the past or not. In addition, the charger 300 can acquire history information on what other chargers 300 the battery 100 has been charged by in the past. Based on the battery identification information, the charger 300 judges whether the charger 300 will actually charge the battery 100 or not, and controls charge.

According to the present example, identification information which a device inherently gives to a battery used by the device and identification information which a charger inherently gives to the battery charged by the charger are stored on the battery side. Based on the identification information, devices and chargers can acquire past history information of charge and discharge inherent to the loaded battery. Accordingly, the devices and the chargers can more precisely adjust the discharge and charge of the battery. Moreover, the devices and the chargers also can enable or disable charge and discharge based on the acquired history information.

OTHER EXAMPLES

Devices within the scope of the present invention are not limited to electronic devices but may include ones in which a battery of the present invention can be used, such as machine tools including power tools, home electric appliances, and the like.

Although the preferred embodiment of the present invention has been described in detail, it should be understood that various changes, substitutions and alterations can be made therein without departing from spirit and scope of the inventions as defined by the appended claims.

According to the present invention, miniaturization and price reduction of a battery can be achieved. Moreover, an available device and a chargeable charger can be identified for each battery. Furthermore, the discharge and charge of a battery can be precisely adjusted.

What is claimed is:

1. A battery comprising
    a storage section in which information for identifying a device able to use the battery is stored;
    a communication control circuit for controlling reading out the information for identifying the device from the storage section; and
    a serial-parallel converter for transmitting the read-out information for identifying a device though a serial bus,
    wherein the information for identifying the device able to use the battery is stored in the storage section of the battery at the time of shipment from a manufacturer.

2. The battery according to claim 1, wherein the information for identifying a device identifies a charger device able to charge the battery.

* * * * *

UNITED STATES PATENT AND TRADEMARK OFFICE
CERTIFICATE OF CORRECTION

PATENT NO.         : 7,227,333 B2                                      Page 1 of 1
APPLICATION NO.    : 10/696666
DATED              : June 5, 2007
INVENTOR(S)        : Yamada et al.

It is certified that error appears in the above-identified patent and that said Letters Patent is hereby corrected as shown below:

Column 8 line 29, replace "though" with --through--.

Signed and Sealed this

Tenth Day of July, 2007

JON W. DUDAS
*Director of the United States Patent and Trademark Office*